US007929653B2

(12) United States Patent
Viswanathan (10) Patent No.: US 7,929,653 B2
(45) Date of Patent: Apr. 19, 2011

(54) OPEN-LOOP DIVERSITY TECHNIQUE FOR SYSTEMS EMPLOYING MULTI-TRANSMITTER ANTENNAS

(75) Inventor: Harish Viswanathan, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 661 days.

(21) Appl. No.: 11/737,535

(22) Filed: Apr. 19, 2007

(65) Prior Publication Data

US 2007/0189369 A1    Aug. 16, 2007

Related U.S. Application Data

(63) Continuation of application No. 09/955,368, filed on Sep. 18, 2001, now Pat. No. 7,227,905.

(51) Int. Cl.
*H04B 7/10* (2006.01)

(52) U.S. Cl. .................. 375/347; 375/267; 375/316

(58) Field of Classification Search .................. 375/316, 375/267, 324, 347, 340
See application file for complete search history.

(56) References Cited

U.S. PATENT DOCUMENTS

| 6,088,408 | A  | 7/2000  | Calderbank et al. |
| 6,317,411 | B1 | 11/2001 | Whinnett et al.   |
| 6,317,466 | B1 | 11/2001 | Foschini et al.   |
| 6,452,981 | B1 | 9/2002  | Raleigh et al.    |

(Continued)

OTHER PUBLICATIONS

"STTD-OTD open-Loop transmit diversity scheme for HSDPA systems with four transmit antennas" by Texas Instruments submission to standards group, TSG-Ran Working Group 1 meeting in Finland, Jun. 25-28, 2001.

(Continued)

*Primary Examiner* — Temesghen Ghebretinsae
(74) *Attorney, Agent, or Firm* — Wall & Tong, LLP (57) ABSTRACT

A method and apparatus for increasing the capacity of a system that use four transmit antennas and that employs conventional channel coding by performing space-time coding in a particular way. Each of two pairs of symbol sub-streams is space-time coded to form a respective pair of transmit-sequence chains, where at least one of the formed pairs of the transmit-sequence chains is a function of symbols of the respective symbol-sub-stream pair and not a function of the symbols of the other symbol-sub-stream pair. Four transmit sequences—two transmit sequences from each of the two pairs of symbol sub-streams—may be viewed as forming a transmission matrices B or B' arranged as follows:

$$\begin{array}{c} \phantom{\text{Antenna 105-1}} \begin{array}{cccc} T_1 & T_2 & T_3 & T_4 \end{array} \\ \text{Antenna 105-1} \\ \text{Antenna 105-2} \\ \text{Antenna 105-3} \\ \text{Antenna 105-4} \end{array} \begin{bmatrix} b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3 & -b_3^* \end{bmatrix} \text{or,}$$

$$\begin{array}{c} \phantom{\text{Antenna 105-1}} \begin{array}{cccc} T_1 & T_2 & T_3 & T_4 \end{array} \\ \text{Antenna 105-1} \\ \text{Antenna 105-2} \\ \text{Antenna 105-3} \\ \text{Antenna 105-4} \end{array} \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix},$$

respectively, where $b_1$, $b_2$, $b_3$, and $b_4$ are the symbols derived from a respective one of four symbol sub-streams, and $b_1^*$, $b_2^*$, $b_3^*$, and $b_4^*$ are, respectively, the complex conjugate of the aforementioned symbols. The rows of the matrix represent the different antennas, while the columns represent different symbol periods.

19 Claims, 4 Drawing Sheets

U.S. PATENT DOCUMENTS

| | | | |
|---|---|---|---|
| 6,510,173 | B1 | 1/2003 | Garmonov et al. |
| 6,542,556 | B1 | 4/2003 | Kuchi et al. |
| 6,594,473 | B1 | 7/2003 | Dabak et al. |
| 6,748,024 | B2 | 6/2004 | Kuchi et al. |
| 6,788,661 | B1 | 9/2004 | Yitalo et al. |
| 6,834,043 | B1 | 12/2004 | Vook et al. |
| 6,865,237 | B1 | 3/2005 | Boariu et al. |
| 6,891,897 | B1 | 5/2005 | Bevan et al. |
| 7,050,510 | B2 * | 5/2006 | Foschini et al. ............... 375/299 |
| 2002/0172293 | A1 | 11/2002 | Kuchi et al. |
| 2005/0063483 | A1 * | 3/2005 | Wang et al. .................. 375/267 |

OTHER PUBLICATIONS

Performance analysis of CDMA transmit diversity methods; Jalloul, L.M.A. et al.; Vehicular Technology Conference, 1999, VTC 1999—Fall, IEEE VTS 50$^{th}$ vol. 3. Sep. 19-22, 1999 pp. 1326-1330 vol. 3.

Space-time coding for capacity enhancement in future-generation wireless communications networks; Bevan, D.D.N. et al.; Capacity & Range enhancement Techniques for 3$^{rd}$ Generation Mobile Comm. & Beyond (Ref. No. 2000/003), IEE Colloquium on Feb. 11, 2000.

A comparison of the open loop transmit diversity schemes for third generation wireless systems, Dabak, A.G. et al.; Wireless Communications and Networking Conference, 2000. WCNC. 2000 IEEE vol. 1, Sep. 23-28, 2000 pp. 437-442 vol.1.

* cited by examiner

FIG. 4

OPEN-LOOP DIVERSITY TECHNIQUE FOR SYSTEMS EMPLOYING MULTI-TRANSMITTER ANTENNAS

CROSS-REFERENCE TO RELATED APPLICATION

This application is a continuation of commonly owned, U.S. patent application Ser. No. 09/955,368, filed Sep. 18, 2001 now U.S. Pat. No. 7,227,905, entitled OPEN-LOOP DIVERSITY TECHNIQUE FOR SYSTEMS EMPLOYING MULTI-TRANSMITTER ANTENNAS, which application is incorporated herein by reference in its entirety.

BACKGROUND OF THE INVENTION

This invention relates to wireless communication systems, and more particularly, to wireless communication systems using multiple antennas at the transmitter and one or more antennas at the receiver.

Wireless communication systems that use multiple antennas at the transmitter are commonly referred to as multiple-input systems. Space-time coding can be used in multiple-input systems to reduce the power needed to transmit information at a particular information data rate and still maintain a certain error rate.

Additionally, it is highly advantageous to employ channel coding in order to approach the maximum open loop capacity of a multiple-input system. (An open loop system is one where the channel characteristics are not fed back to the transmitter.) The state-of-the-art channel codes, e.g., turbo codes, trellis codes and the like, are typically spatially one dimensional, i.e., they are designed for only a single transmit antenna. A goal in the wireless communication industry is to employ such codes in a multiple-input system.

SUMMARY OF THE INVENTION

One technique employing channel coding in a four-transmit-antenna system uses a so-called decoupled space-time coding approach, described in more detail in, U.S. patent application Ser. No. 09/752,637, filed on Dec. 29, 2000, entitled "Open-Loop Diversity Technique For Systems Employing Four Transmitter Antennas".

The present inventors have recognized that it is possible to further increase the capacity of multiple-input systems that use four transmit antennas and that employ conventional channel coding by performing the space-time coding in a particular way. Each of at least two pairs of symbol sub-streams is space-time coded to form a respective pair of transmit-sequence chains. At least one of the formed pairs of the transmit-sequence chains is a function of symbols of the respective pair of symbol sub-streams and not a function of the symbols of the other pairs' symbol sub-streams. The symbol sub-streams are functions of the primitive data stream. The primitive data stream is channel coded, mapped into symbol space, and demultiplexed into the symbol sub-streams.

Illustratively, the symbol sub-steam pairs are space-time coded such that the first pair of transmit-sequence chains is a function of the symbols of a first symbol-sub-stream pair and not a function of the symbols of a second symbol-sub-stream pair. The second pair of transmit-sequence chains is a function of the symbols of the second symbol-sub-stream pair and not a function of the symbols of the first symbol-sub-stream pair.

In an illustrative embodiment of the invention, each transmit sequence of a particular transmit-sequence chain is formed from 1) a symbol of one of the symbol sub-streams of the respective symbol-sub-stream pair and 2) a complex conjugate of a symbol of the other symbol sub-stream of the pair. The symbol of 1) and symbol complex conjugate of 2) form a transmit sequence having a duration of four symbol periods. Four transmit sequences—two transmit sequences formed from each of two symbol-sub-stream pairs—may be arranged as transmission matrix B. Each row of the matrix corresponds to a transmit antenna. The elements of each row represent the symbols that are transmitted by the respective antenna in four symbol periods. The matrix B is arranged as follows:

$$\begin{array}{c} \phantom{\text{Antenna 105-1}} \begin{array}{cccc} T_1 & T_2 & T_3 & T_4 \end{array} \\ \text{Antenna 105-1} \\ \text{Antenna 105-2} \\ \text{Antenna 105-3} \\ \text{Antenna 105-4} \end{array} \begin{bmatrix} b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3 & -b_3^* \end{bmatrix},$$

where $b_1$, $b_2$, $b_3$, and $b_4$ are the symbols derived from a respective one of four symbol sub-streams, and $b_1^*$, $b_2^*$, $b_3^*$, and $b_4^*$ are, respectively, the complex conjugate of the aforementioned symbols. The rows of the matrix represent the different transmit sequences, while the columns represent different symbol periods ($T_i$, i=1 ... 4).

In another embodiment of the invention, each transmit sequence of a particular transmit-sequence chain is formed from 1) a symbol of one of the symbol sub-streams of the respective symbol-sub-stream pair, and 2) a complex conjugate of a symbol of the other symbol sub-stream of the pair. The symbol of 1) and symbol complex conjugate of 2) form a transmit sequence having a duration of four symbol periods, two of which are blank. Four transmit sequences—two transmit sequences formed from each of the two symbol sub-stream pairs—may be arranged as a transmission matrix B'. Each row of the matrix corresponds to a transmit antenna. The elements of each row represent the symbols that are emitted by the respective antenna in four symbol periods. Matrix B' is arranged as follows:

$$\begin{array}{c} \phantom{\text{Antenna 105-1}} \begin{array}{cccc} T_1 & T_2 & T_3 & T_4 \end{array} \\ \text{Antenna 105-1} \\ \text{Antenna 105-2} \\ \text{Antenna 105-3} \\ \text{Antenna 105-4} \end{array} \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix}$$

Matrix B' is orthogonal, that is $B'^{\dagger}B'$ produces a matrix whose diagonal entries are non-zero and whose non-diagonal entries are zero, where $B'^{\dagger}$ is the complex conjugate transpose of B'.

Note, matrix B can be obtained from matrix B' by repeating each of the non-zero elements of matrix B' so that each symbol is in two symbol periods. Furthermore to obtain B from B', the signs of the elements of the second pair of transmit-sequence chains is changed when the symbol is repeated.

Advantageously, using the space-time coding approach of the present invention, the primitive data stream may be channel coded using conventional channel coding techniques, e.g., turbo coding, prior to being space-time coded and the advantages of such channel coding may be exploited at the receiver.

The figures are not drawn to scale and illustrate the interconnectivity of the depicted systems and not necessarily their spatial layout and physical dimensions.

DETAILED DESCRIPTION

As described above, a goal in the wireless communication industry is to employ channel codes in a multiple-input system. One technique employing channel coding in a four-transmit-antenna system uses a so-called decoupled space-time coding approach. See for example, U.S. patent application Ser. No. 09/752,637, filed on Dec. 29, 2000, entitled "Open-Loop Diversity Technique For Systems Employing Four Transmitter Antennas", incorporated herein by this reference.

Figure 1:
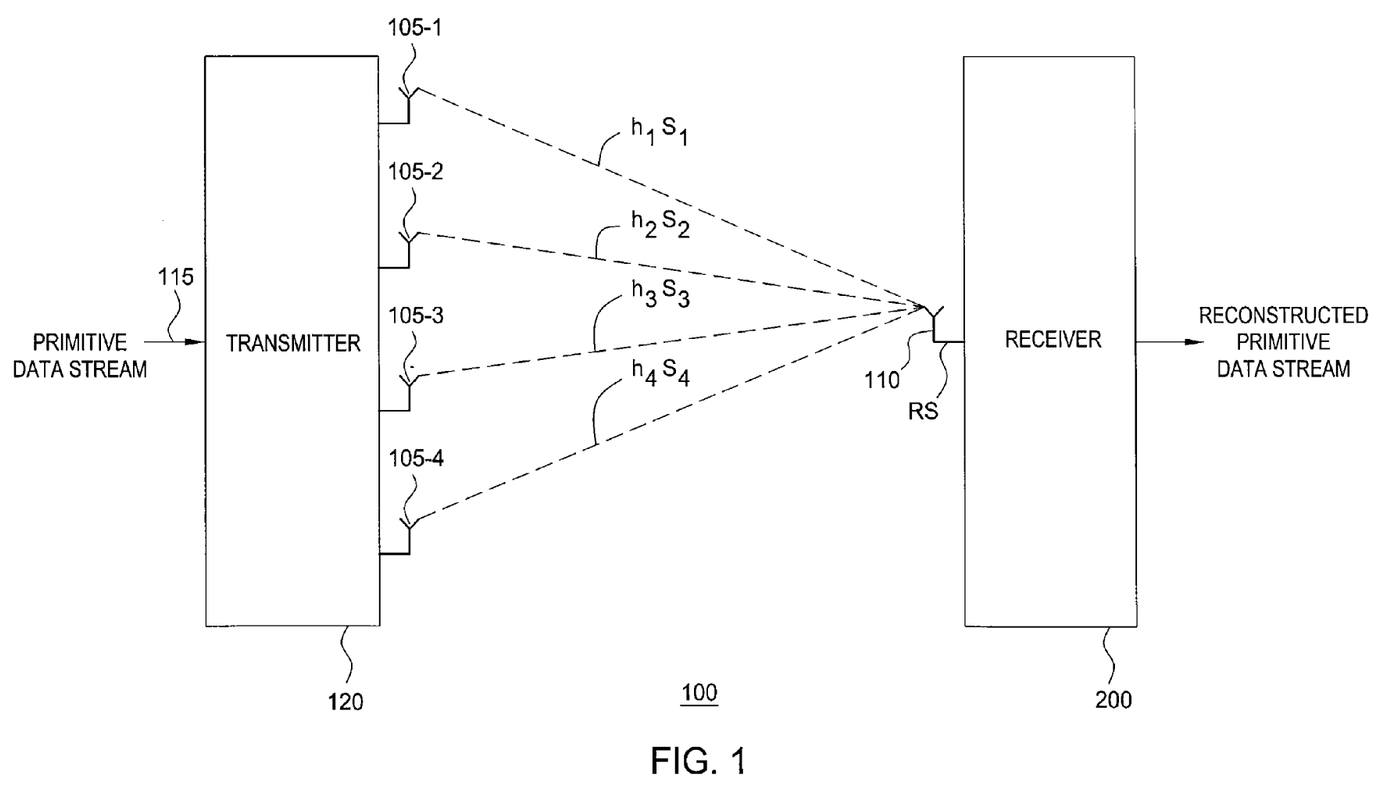
FIG. 1 illustrates a portion of a multiple-input wireless communication system.

FIG. 1 illustrates multiple-input wireless communication system 100 having four transmit antennas 105-1, 105-2, 105-3 and 105-4, and one receive antenna 110. In system 100, primitive data stream 115—the data to be transmitted—is supplied to transmitter 120.

Figure 2:
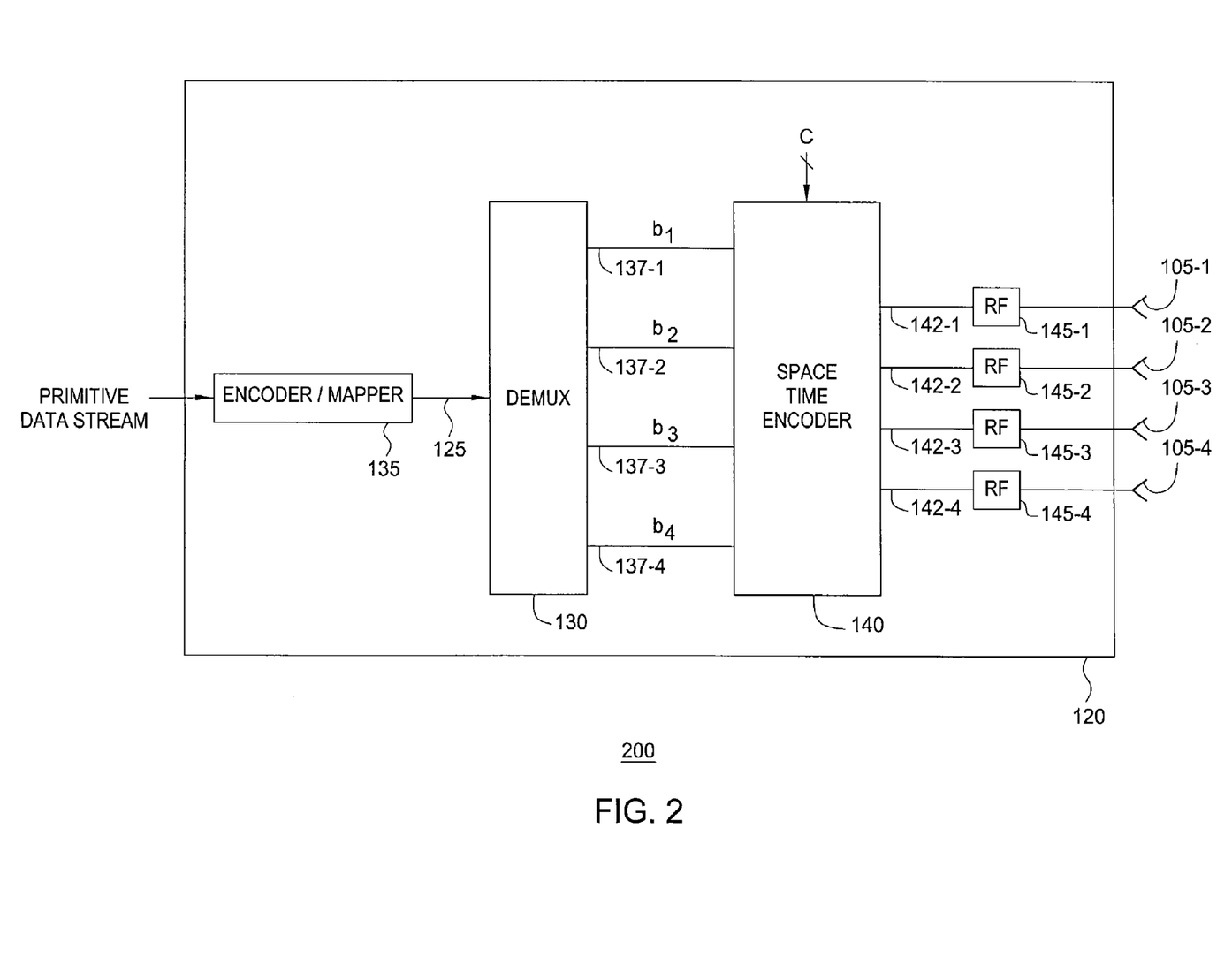
FIG. 2 illustrates in more detail a transmitter arranged in accordance with the principles of the invention.

FIG. 2 shows, in more detail, exemplary transmitter 120 arranged in accordance with the principles of the invention. Transmitter 120 space-time codes each of the two pairs of symbol sub-streams to form a respective pair of transmit-sequence chains. The space-time coding is such that a particular formed pair of transmit-sequence chains is a function of symbols of the respective symbol sub-stream pair and not a function of the symbols of the other symbol sub-stream pair. Illustratively, the symbol-sub-steam pairs are space-time coded such that the first pair of transmit-sequence chains is a function of the symbols of the first symbol-sub-stream pair and not a function of the symbols of a second symbol-sub-stream pair. The second pair of transmit-sequence chains is a function of the symbols of the second symbol-sub-stream pair and not a function of the symbols of the first symbol-sub-stream pair. Symbols are a result of mapping the bits of the (channel-coded) primitive data streams into symbol space. The four symbol sub-streams are processed so that they may be transmitted via four transmit antennas.

Transmitter 120 processes primitive data stream 115. Primitive data stream 115 is channel coded and mapped in encoder/mapper 135 to produce symbol stream 125. Advantageously, encoder/mapper 135 may employ conventional channel coding, such as turbo coding. Encoder/mapper 135 may also perform the mapping of the bits to a discrete alphabet or modulation symbol constellation after doing the actual coding.

The outputs of encoder/mapper 135 are referred to herein as symbols. Symbols are a result of mapping the bits of the channel-coded primitive data stream into symbol space. (Note, that if the primitive data stream is not channel-coded, that is transmitter 120 uses a mapper instead of the encoder/mapper, then symbols are a result of mapping the bits of the uncoded primitive data stream into symbol space.) The time duration of a symbol is referred to as a symbol period.

The channel coded and mapped symbol stream 125 is divided into a plurality of symbol sub-streams 137-1, 137-2, 137-3, and 137-4 typically by demultiplexing symbol stream 125 in demultiplexer 130 into the plurality of symbol sub-streams. (Typically, the number of symbol sub-streams equals the number of transmit antennas.)

The symbol sub-streams 137-1, 137-2, 137-3, and 137-4 are supplied to space-time encoder 140 where every symbol period, space-time encoder 140 processes the symbols of the symbol sub-streams to form a part of each of four transmit-sequence chains 142-1, 142-2, 142-3, and 142-4. The transmit-sequence chains are composed of transmit sequences. Each transmit sequence spanning at least four symbol periods. The symbols are processed to develop their complex conjugate. Each transmit sequence of a particular transmit-sequence chain is formed from 1) a symbol of one of the symbol sub-streams of the respective symbol-sub-stream pair and 2) a complex conjugate of a symbol of the other symbol sub-stream of the respective symbol-sub-stream pair. Four transmit sequences—two transmit sequences formed from each of the two pairs of symbol sub-streams—that result from the operation of the space-time encoder 140 can be represented as matrix B. Each row of matrix B corresponds to one of transmit antennas 105-1, 105-2, 105-3, and 105-4. More specifically, the elements of each row represent symbols that are emitted by the corresponding one of transmit antennas 105-1, 105-2, 105-3, and 105-4 in four symbol periods. In such an embodiment of the invention, matrix B is:

$$\begin{array}{c} \text{Antenna } 105\text{-}1 \\ \text{Antenna } 105\text{-}2 \\ \text{Antenna } 105\text{-}3 \\ \text{Antenna } 105\text{-}4 \end{array} \begin{bmatrix} T_1 & T_2 & T_3 & T_4 \\ b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3^* & -b_3^* \end{bmatrix}, \quad (1)$$

where, $b_1$ and $b_2$ are symbols of the first and second symbol sub-streams, respectively, of one symbol-sub-stream pair, $b_3$ and $b_4$ are symbols of first and second symbol sub-streams, respectively, of the other symbol-sub-stream pair, and $b_1^*$, $b_2^*$, $b_3^*$, and $b_4^*$ are complex conjugates of $b_1$, $b_2$, $b_3$, and $b_4$, respectively. As indicated, each row of matrix B represents a different transmit sequence, and each column represents a different symbol period ($T_i$, i=1 ... 4).

The principles of the present invention can be used in a system that employs direct sequence spreading, such as, for example a code division multiple access (CDMA) system. In such a system, space-time encoder 140 further multiplies each element of matrix B by a spreading code sequence represented by c, which spans 1 symbol period and contains N chips, where N is the spreading gain.

Each transmit-sequence chain 145-1, 145-2, 145-3, and 145-4 developed by space-time encoder 140 is supplied as an input to a respective one of radio frequency (RF) units 145-1, 145-2, 145-3, and 145-4. The radio frequency units perform all the necessary processing to convert their respective transmit-sequence chains from baseband to radio frequency modulated signals. The radio frequency modulated signal developed by one of the RF units 145-1, 145-2, 145-3, and 145-4, is supplied to a respective one of the transmit antennas 105-1, 105-2, 105-3, and 105-4 from which the signal is transmitted.

The channels between each pair of transmit and receive antennas are shown in FIG. 1. Each channel has its own channel characteristic $h_i$, where i=1, 2, 3, 4 and $h_i$ represents the channel characteristic between the $i^{th}$ transmit antenna and the receive antenna. (The channel characteristic may also be referred to as a channel estimate or channel statistic.) Thus, the signal $h_iS_i$ on each channel is the transmitted signal from the channel's corresponding transmit antenna as modified by the channel characteristic.

The transmitted signals $S_1$, $S_2$, $S_3$, and $S_4$, modified by the respective channel characteristics, arrive at the receive antenna 201. Thus, the received signal $R_S$ at the receive antenna is a superposition of the transmitted signals $S_1$, $S_2$, $S_3$, and $S_4$ as modified by the channel characteristics, plus noise $\eta$, making the receive antenna signal:

$$R_S = h_1 S_1 + h_2 S_2 + h_3 S_3 + h_4 S_4 + \eta \tag{5}$$

Figure 3:
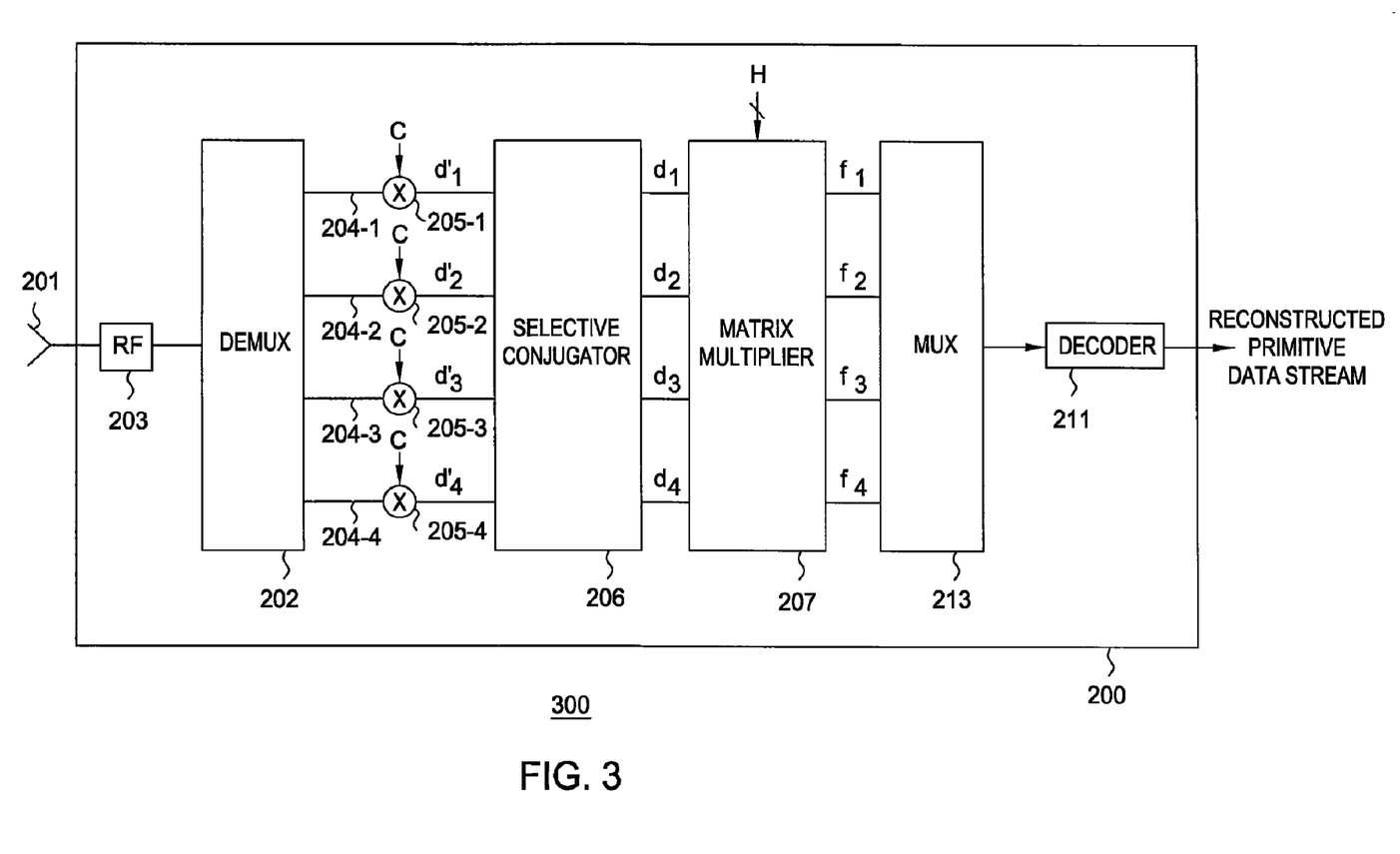
FIG. 3 illustrates in more detail a receiver arranged in accordance with the principles of one embodiment of the invention.

FIG. 3 shows, in more detail, an exemplary embodiment of receiver 200 arranged in accordance with the principles of the invention. Antenna 201 supplies an electrical version of the received signal to RF unit 203. RF unit 203 converts the radio frequency signal supplied to it by antenna 201 to a baseband version thereof.

Demultiplexer 202 divides the received baseband signal into four received symbol sub-streams 204-1, 204-2, 204-3, and 204-4, with the symbols received in one of four consecutive symbol periods allocated to a different received symbol sub-stream. Demultiplexer 202 provides each of the received symbol sub-streams to a respective one of the correlators 205-1, 205-2, 205-3, and 205-4.

If the system uses direct sequence spreading, such as a code division multiple access (CDMA) system, each correlator 205 is supplied with an orthogonal spreading code sequence represented as a horizontal vector c. The orthogonal spreading code sequence c spans 1 symbol period and contains N chips, where N is the spreading gain. Thus, correlators 205 perform despreading, which is the inverse of the spreading performed in space-time encoder 140. Each correlator supplies a despread symbol sub-stream to selective conjugator 206. (If correlators 205 are not present, demultiplexer 202 provides the received symbol sub-streams directly to respective inputs of selective conjugator 206.)

Selective conjugator 206 determines the complex conjugate of any of the outputs $d_i'$ of correlators 205 that is being sought in the system of linear equations that describes the input to matrix multiplier 207. This system of linear equations $$d = \begin{bmatrix} d_1 \\ d_2 \\ d_3^* \\ d_4^* \end{bmatrix} = \begin{bmatrix} h_1 & h_2 & h_3 & h_4 \\ h_1 & h_2 & -h_3 & -h_4 \\ h_2^* & -h_1^* & h_4^* & -h_3^* \\ h_2^* & -h_1^* & -h_4^* & h_3^* \end{bmatrix} \begin{bmatrix} b_1 \\ b_2 \\ b_3 \\ b_4 \end{bmatrix} + \begin{bmatrix} \eta_1 \\ \eta_2 \\ \eta_3 \\ \eta_4 \end{bmatrix}, \tag{6}$$

where $d_3^*$ and $d_4^*$ are the complex conjugates of $d_3$ and $d_4$, respectively.

Matrix multiplier 207 operates on the received vertical vector d to produce four match-filtered outputs. To this end, matrix multiplier 207 also receives, or derives, a 4×4 matrix $H^\dagger$, where $\dagger$ denotes complex conjugate transpose, also known as Hermitian transpose. As noted above, H, is the following matrix $$\begin{bmatrix} h_1 & h_2 & h_3 & h_4 \\ h_1 & h_2 & -h_3 & -h_4 \\ h_2^* & -h_1^* & h_4^* & -h_3^* \\ h_2^* & -h_1^* & -h_4^* & h_3^* \end{bmatrix} \tag{7}$$

thus $H^\dagger$ is $$\begin{bmatrix} h_1^* & h_1^* & h_2 & h_2 \\ h_2^* & h_2^* & -h_1 & -h_1 \\ h_3^* & -h_3^* & h_4 & -h_4 \\ h_4^* & -h_4^* & -h_3 & h_3 \end{bmatrix}, \tag{8}$$

where, as described above, $h_i$ is the complex channel characteristic of the channel from the $i^{th}$ transmit antenna to the receiver antenna if the space-time coding performed by space-time encoder 140 of FIG. 2 is considered part of the operation of this channel and assuming all the channels are flat-faded. The matrix $H^\dagger$ multiplies from the left the 4×1 vertical vector d formed by the outputs of correlators 205 to produce a new 4×1 vertical vector f, i.e., $f = H^\dagger d$.

Note that H is orthogonal, that is $H^\dagger H$, produces a matrix whose diagonal entries are non-zero and whose non-diagonal entries are zero.

$$H^\dagger H = \begin{bmatrix} 2(|h_1|^2 + |h_2|^2) & 0 & 0 & 0 \\ 0 & 2(|h_1|^2 + |h_2|^2) & 0 & 0 \\ 0 & 0 & 2(|h_3|^2 + |h_4|^2) & 0 \\ 0 & 0 & 0 & 2(|h_3|^2 + |h_4|^2) \end{bmatrix}. \tag{9}$$

is generally represented, when the channel is a flat-faded channel, as d=Hb+noise. d is the vertical vector that is the output of selective conjugator 206, b is a vertical vector formed from $b_1$, $b_2$, $b_3$, and $b_4$, and H is a matrix that is a function of channel characteristics $h_1$, $h_2$, $h_3$, and $h_4$ and matrix B. Note, H is the matrix derived from the channel characteristics where H maps a) the symbols of the symbol sub-streams prior to space-time coding to b) the received signals after the selective conjugator. H is the matrix of the channel characteristics if the space-time coding performed by space-time encoder 140 of FIG. 2 is considered part of the operation of the channel.

For example, when, as described hereinabove, matrix B is shown as matrix (1), then The results of matrix multiplier 207 (i.e. the vertical vector f) are then supplied as an input to multiplexer (MUX) 213 which interleaves them in the inverse pattern of DEMUX 130 to reconstruct the symbol stream, forming reconstructed symbol stream 225.

Reconstructed symbol stream 225 is then decoded by decoder 211 to produce reconstructed primitive data stream 215. The decoding performed by decoder 211 is advantageously the inverse of that performed by encoder/mapper 135. Decoder 221 may also perform the de-mapping. (Note that decoding may be eliminated entirely if coding was not performed by encoder/mapper 135, shown in FIG. 2.) Note that the decision functionality that is part of the digital demodulation, that is process that selects the closest constellation point (i.e. the de-mapping process), may be in decoders 211 or in a separate unit whose functionality is performed either before or after the functionality of multiplexer 213. Furthermore, the particular algorithm used to achieve the decision functionality is at discretion of the implementor.

In another embodiment of the invention, each transmit sequence of a particular transmit-sequence chain is a formed from 1) a symbol of one of the symbol sub-streams of the respective symbol-sub-stream pair, 2) a complex conjugate of a symbol of the other symbol sub-stream of the respective symbol-sub-stream pair. The symbol of 1) and symbol complex conjugate of 2) form a transmit sequence having a duration of four symbol periods, two of which are blank. Four transmit sequences—two transmit sequences formed from each of the two pairs of symbol sub-streams—may be arranged as a transmission matrix B'. Each row of matrix B' corresponds to a transmit antenna, and the elements of each row represent the symbols that are emitted by the corresponding antenna in four symbol periods. The matrix B' is arranged as follows:

$$\begin{array}{c} \phantom{Antenna\ 105\text{-}1} \begin{array}{cccc} T_1 & T_2 & T_3 & T_4 \end{array} \\ \begin{array}{c} \text{Antenna } 105\text{-}1 \\ \text{Antenna } 105\text{-}2 \\ \text{Antenna } 105\text{-}3 \\ \text{Antenna } 105\text{-}4 \end{array} \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix}, \end{array} \quad (10)$$

where, $b_1$ and $b_2$ are symbols of first and second symbol sub-streams, respectively, of one of the symbol-sub-stream pairs, $b_3$ and $b_4$ are symbols of first and second symbol sub-streams, respectively, of another of the symbol-sub-stream pairs, and $b_1^*$, $b_2^*$, $b_3^*$, and $b_4^*$ are complex conjugates of $b_1$, $b_2$, $b_3$, and $b_4$, respectively. As indicated, the rows of the matrix represent the different transmit sequences, while the columns represent different symbol periods ($T_i$, i=1 . . . 4), with each column representing one symbol period.

The matrix B' is orthogonal, that is $B^{\dagger\prime}B'$ produces a matrix whose diagonal entries are non-zero and whose non-diagonal entries are zero, where $B^{\dagger\prime}$ is the complex conjugate transpose of matrix B'. Thus, $$B^{\dagger\prime} = \begin{bmatrix} b_1^* & b_2^* & 0 & 0 \\ -b_2 & -b_1 & 0 & 0 \\ 0 & 0 & b_3^* & b_4^* \\ 0 & 0 & -b_4 & b_3 \end{bmatrix}, \quad (11)$$

and $$B^{\dagger}B = \begin{bmatrix} (|b_1|^2+|b_2|^2) & 0 & 0 & 0 \\ 0 & (|b_1|^2+|b_2|^2) & 0 & 0 \\ 0 & 0 & (|b_3|^2+|b_4|^2) & 0 \\ 0 & 0 & 0 & (|b_3|^2+|b_4|^2) \end{bmatrix} \quad (12)$$

Similarly to the above-described embodiment, this embodiment can also be used in a system that employs direct sequence spreading. As described above, space-time encoder 140 multiplies each element of matrix B' by a spreading code sequence represented by c, which spans 1 symbol period and contains N chips, where N is the spreading gain. The result is then supplied to frequency (RF) units 145-1, 145-2, 145-3, and 145-4 that perform all the necessary processing to convert their respective transmit-sequence chains from baseband to radio frequency modulated signals. The radio frequency modulated signal are then transmitted over a respective one of the transmit antennas 105-1, 105-2, 105-3, and 105-4.

Figure 4:
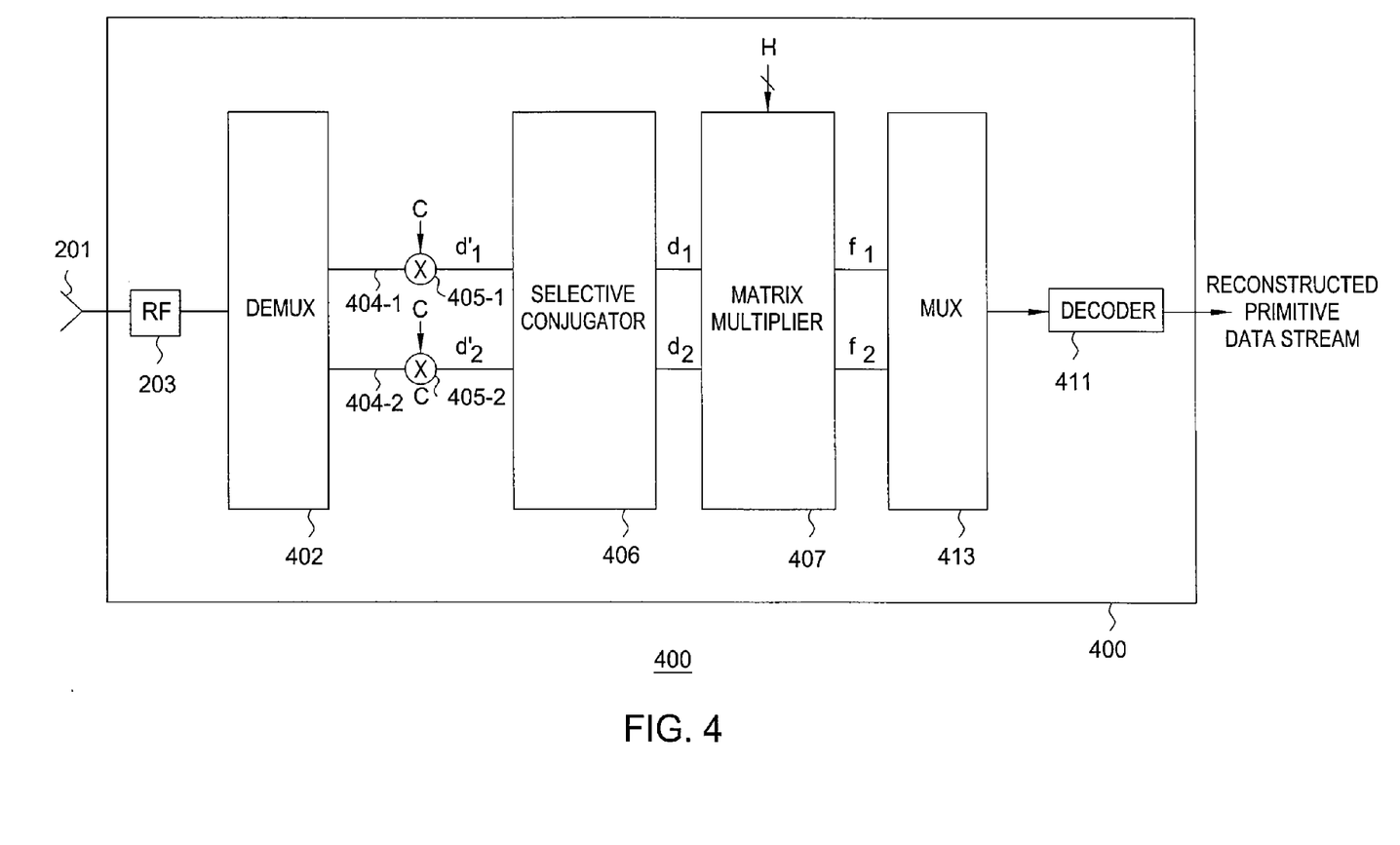
FIG. 4 illustrates a receiver arranged in accordance with the principles of another embodiment of the invention.

The transmitted signals modified by the respective channel characteristics, arrive at the receive antenna 201 of receiver 400. FIG. 4 shows an exemplary embodiment of receiver 400 arranged in accordance with the principles of the invention. In this embodiment of the invention, receiver 400 can be used instead of receiver 200 in system 100 of FIG. 1. In receiver 400, demultiplexer 402 divides the received signal into two received symbol sub-streams 404-1 and 404-2, as opposed to the four received symbol sub-streams of the above described embodiment. Each of the received symbol sub-streams 404-1 and 404-2 is applied one of two correlators 405-1 and 405-2, that produce a pair of symbol sub-streams in two symbol periods and another pair of symbol sub-streams in the subsequent two symbol periods. The symbol sub-streams are further processed, either jointly or individually, to ultimately develop a reconstructed version of the primitive data stream.

Particularly, as in the above embodiment, antenna 201 supplies the received radio frequency signal to RF unit 203. RF unit 203 converts the radio frequency signal to a baseband version thereof.

Demultiplexer 402 divides the received baseband signal into two received encoded symbol sub-streams 404-1 and 404-2, with the symbols received in one of two consecutive symbol periods being part of a different received encoded symbol sub-stream. Demultiplexer 402 supplies one of the received encoded symbol sub-streams to one of the correlators 405-1 and 405-2, respectively.

As described above, correlators 405-1 and 405-2 perform despreading. Despreading is the inverse of the spreading performed in space-time encoder 140. The correlators 405-1 and 405-2 supply the despread symbol sub-streams to selective conjugator 406. (If correlators 405 are not present, demultiplexer 402 supplies the received encoded symbol sub-streams directly to selective conjugator 406.)

Selective conjugator 406 determines the complex conjugate of any of the outputs $d_i'$ of correlators 405 that is being sought in the system of linear equations that describes the input to matrix multiplier 407. When the channel is a flat-faded channel, this system of linear equations is generally represented as $d_{12}=H_{12}b_{12}$+noise in a certain pair of consecutive symbol periods, and $d_{34}=H_{34}b_{34}$+noise in a subsequent pair of consecutive symbol periods. $d_{12}$ is the vertical vector that is the output of selective conjugator 406 in the former pair of consecutive symbol periods, and $d_{34}$ is the vertical vector that is the output of selective conjugator 406 in the latter pair of consecutive symbol periods. $b_{12}$ is a vertical vector formed from $b_1$ and $b_2$, and $b_{34}$ is a vertical vector formed from $b_3$ and $b_4$. Matrix $H_{12}$ is a function of channel characteristics $h_1$, and $h_2$ and matrix B'. Matrix $H_{34}$ is a function of channel characteristics $h_3$, and $h_4$ and matrix B'. Note, $H_{12}$ and $H_{34}$ are the matrixes derived from the channel characteristics. $H_{12}$ maps a) the symbols of the first symbol sub-stream pair prior to space-time coding to b) the received signals after the selective conjugator. $H_{34}$ maps a) the symbols of the second symbol sub-stream pair prior to space-time coding to b) the received signals after the selective conjugator. $H_{12}$ and $H_{34}$ are the matrices of the channel characteristics if the space-time coding performed by space-time encoder of the transmitter is considered part of the operation of the channel.

For example, if matrix B' is arranged in the manner described hereinabove as matrix (13), then $$d_{12} = \begin{bmatrix} d_1 \\ d_2^* \end{bmatrix} = \begin{bmatrix} h_1 & h_2 \\ h_2^* & -h_1^* \end{bmatrix} \begin{bmatrix} b_1 \\ b_2 \end{bmatrix} + \begin{bmatrix} \eta_1 \\ \eta_2 \end{bmatrix} \quad (14)$$

and $$d_{34} = \begin{bmatrix} d_3 \\ d_4^* \end{bmatrix} = \begin{bmatrix} h_3 & h_4 \\ h_4^* & -h_3^* \end{bmatrix} \begin{bmatrix} b_3 \\ b_4 \end{bmatrix} + \begin{bmatrix} \eta_3 \\ \eta_4 \end{bmatrix} \quad (15)$$

where $d_2^*$ and $d_4^*$ are the complex conjugates of $d_2$ and $d_4$, respectively.

Matrix multiplier 407 operates on the received vertical vectors $d_{12}$ and $d_{34}$ to produce two match-filtered outputs. To this end, matrix multiplier 407 also receives, or derives, two 2×2 matrixes $H_{12}^\dagger$ and $H_{34}^\dagger$, where † denotes complex conjugate transpose, also known as Hermitian transpose. As noted above, $H_{12}$ and $H_{34}$, are the following matrices:

$$H_{12} = \begin{bmatrix} h_1 & h_2 \\ h_2^* & -h_1^* \end{bmatrix}, \quad (16)$$

and $$H_{34} = \begin{bmatrix} h_3 & h_4 \\ h_4^* & -h_3^* \end{bmatrix}. \quad (17)$$

Thus, $$H_{12}^\dagger = \begin{bmatrix} h_1^* & h_2 \\ h_2^* & -h_1^* \end{bmatrix}, \quad (18)$$

and $$H_{34}^\dagger = \begin{bmatrix} h_3^* & h_4 \\ h_4^* & -h_3^* \end{bmatrix}, \quad (19)$$

where, as described above, $h_i$ is the complex channel characteristic of the channel from the $i^{th}$ transmit antenna to the receiver antenna if the space-time coding performed by space-time encoder 140 of FIG. 2 is considered part of the operation of the channel and assuming all the channels are flat-faded channels. The matrixes $H_{12}^\dagger$ and $H_{34}^\dagger$ multiply from the left the 2×1 vertical vector $d_{12}$ and $d_{34}$, respectively, formed by the outputs of correlators 405-1 and 405-2 to produce two new 2×1 vertical vectors $f_{12}$ and $f_{34}$, i.e., $f_{12} = H_{12}^\dagger d_{12}$, and $f_{34} = H_{34}^\dagger d_{34}$.

Note that $H_{12}$ is orthogonal, that is $$H_{12}^\dagger H_{12} = \begin{bmatrix} (|h_1|^2 + |h_2|^2) & 0 \\ 0 & (|h_1|^2 + |h_2|^2) \end{bmatrix} \quad (20)$$

and that $H_{34}$ is orthogonal, that is $$H_{34}^\dagger H_{34} = \begin{bmatrix} (|h_3|^2 + |h_4|^2) & 0 \\ 0 & (|h_3|^2 + |h_4|^2) \end{bmatrix} \quad (21)$$

The results of matrix multiplier 407 are then supplied as an input to multiplexer (MUX) 413 (FIG. 3) which interleaves them in the inverse pattern of DEMUX 130 to reconstruct the symbol stream, forming reconstructed symbol stream 225. As described above, reconstructed symbol stream 225 is then decoded by decoder 211 to produce reconstructed primitive data stream 215.

Although the present embodiment is described with receiver 400 that separately obtains each pair of symbol substreams, in alternative embodiments the receiver can be similar to receiver 200 with $$d = \begin{bmatrix} d_1 \\ d_2^* \\ d_3 \\ d_4^* \end{bmatrix} = \begin{bmatrix} h_1 & -h_2^* & 0 & 0 \\ h_2 & h_1^* & 0 & 0 \\ 0 & 0 & h_3 & -h_4^* \\ 0 & 0 & h_4 & h_3^* \end{bmatrix} \begin{bmatrix} b_1 \\ b_2 \\ b_3 \\ b_4 \end{bmatrix} + \begin{bmatrix} \eta_1 \\ \eta_2 \\ \eta_3 \\ \eta_4 \end{bmatrix}, \quad (22)$$

and $$H^\dagger = \begin{bmatrix} h_1^* & h_2 & 0 & 0 \\ -h_2^* & h_1 & 0 & 0 \\ 0 & 0 & h_3^* & h_4 \\ 0 & 0 & -h_4^* & h_3 \end{bmatrix}. \quad (23)$$

In the latter-described illustrative embodiment using matrix B', in some symbol periods nothing is transmitted on some of the transmit antennas. For example, in the first symbol period there are symbols transmitted on antennas 105-1 and 105-2 and there are no symbols transmitted on antennas 105-3 and 105-4. Thus, sometimes there is zero power on some of the transmit antennas. This may produce a distorted power spectrum envelope with power outside the power spectrum envelope allowed to the service provider of system 100 by the FCC. The former described illustrative embodiment, using matrix B, does not raise this concern.

When total power of the transmitter remains the same when either matrix B' or B is used, because only two antennas are used at particular time to transmit the elements of matrix B', then the power on any particular one of these antenna is twice power on a particular antenna transmitting the elements of matrix B.

Matrixes B and B' of the two above described illustrative embodiments are related in that the elements of matrix B can be obtained from the elements of the matrix B' by repeating each of the non-zero elements of matrix B' so that each symbol is in two symbol periods, and, furthermore, the signs of the elements of the second pair of transmit-sequence chains of is changed when the symbol is repeated. Thus, the first non-zero element of each of the transmission sequences that form matrix B' is the first and second elements of the transmission sequences that form B, and the second non-zero element of each of the transmission sequences that form B' is the third and fourth elements of the transmission sequences that form B.

Advantageously, using the space-time coding approach of the present invention, the primitive data stream may be channel coded using conventional channel coding techniques, e.g., turbo coding, and the advantages of such channel coding may be exploited at the receiver.

The foregoing is merely illustrative and various alternatives will now be discussed. For example, the matrixes of the illustrative embodiments are illustrated using $b_1$, $b_2$, $b_3$, and $b_4$. In alternative embodiments any transmit sequences can be used where each of at least two pairs of symbol sub-streams is space-time coded to form a respective pair of transmit-sequence chains. The space-time coding is such that at least one of the formed pairs of the transmit-sequence chains is a function of symbols of the respective pair of symbol sub-streams and not a function of the symbols of the other pairs of the symbol sub-streams.

In the illustrative embodiment the system is in use in an environment having flat-faded channels. Those of ordinary skill in the art of non-flat-faded channels will be able to apply the techniques of the invention for use with non-flat-faded channels.

In the illustrative embodiment encoder/mapper 135 performs both the channel coding and the mapping. In alternative embodiments, the functionality of either the channel coding or the mapping can be either omitted or performed either earlier or latter in the process. Additionally, although the encoder/mapper is shown as one functional block, it can be implemented as either one or as separate functional blocks, in either hardware or software or a combination of hardware and software.

In the illustrative embodiment the system is a multiple-input system. In the alternative embodiments the system can be a multiple-input, multiple-output; where a multiple-input, multiple-output system is one that has multiple antennas at the transmitter and multiple antennas at the receiver. In the latter case the symbols are reconstructed for each of the received symbol sub-streams developed at each receive antenna in the manner described hereinabove. They may then be combined to develop an improved estimate of the original symbol. Such combination may be achieved, for example, by averaging values for each corresponding symbol.

The illustrative embodiments use RF antennas. In alternative embodiments any form of antennas may be employed, e.g., a light source. Furthermore, although radio frequency units are shown in the illustrative embodiments, in other embodiments of the invention, e.g., those using light for communicating the transmitted signal, different modulators and demodulators may be employed.

In the illustrative embodiment, encoder/mapper 135 processes the primitive data stream and the resulting symbol stream is divided into a plurality of symbol sub-streams. In alternative embodiments, the primitive data stream may be first divided into a plurality of data sub-streams each of which would then be processed by a respective one of a plurality of encoder/mappers and the plurality of resulting symbol sub-streams supplied to space time encoder 140. In the latter case the channel coding of each data sub-stream may be independent of the channel coding of the other data sub-streams.

In the illustrative embodiments that uses matrix B' nothing is transmitted on some of the transmit antennas in some symbol periods. In alternative embodiments, known symbols may be transmitted instead of not transmitting anything on those antennas. These known symbols will then be subtracted out.

The transmitter and receiver embodying the principles of the present invention can be used in various parts of a wireless communication system in addition, or instead of, the ones shown in the illustrative embodiments. For example, the transmitter can be part of a base station and the receiver part a mobile terminal, and/or vice versa, i.e. the transmitter can be part of the mobile terminal and the receiver part of the base station. Alternatively, the transmitter can be part of a wireless hub of a wireless local area network and the receiver part a terminal of a wireless local area network, such as a laptop, and/or vice versa. Or, each of the transmitter and receiver can be part of a fixed wireless network, for example the transmitter and receiver can be part of a fixed wireless system set up for communication between two buildings.

The block diagrams presented in the illustrative embodiments represent conceptual views of illustrative circuitry embodying the principles of the invention. Any of the functionally of the illustrative circuitry can be implemented as either a single circuit or as multiple circuits. The functionality of multiple illustrative circuitry can also be implemented as a single circuit. Additionally, one or more of the functionally of the circuitry represented by the block diagrams may be implemented in software by one skilled in the art with access to the above descriptions of such functionally.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the invention has been described with reference to a preferred embodiment, it will be understood by those skilled in the art having reference to the specification and drawings that various modifications and alternatives are possible therein without departing from the spirit and scope of the invention.

I claim:

1. A receiver, comprising:
   at least one receive antenna; and
   a matrix multiplier for multiplying a matrix with received symbol sub-streams of a signal received by the receive antenna, the matrix having at least two pairs of consecutive rows, each such pair being a function of channel characteristics of at least two channels that terminate on the receive antenna but not of channel characteristics of other channels that terminate on the receive antenna, and the matrix being orthogonal;
   wherein the sequence of received symbols of a particular channel is a function of 1) a symbol of one of the symbol sub-streams associated with one of the channels of the respective channel pair and 2) a complex conjugate of a symbol of the other symbol sub-stream associated with the other channel of the respective channel pair.

2. The receiver of claim 1, wherein the matrix is $H^\dagger$, which comprises one of:

$$\begin{bmatrix} h_1^* & h_1^* & h_2 & h_2 \\ h_2^* & h_2^* & -h_1 & -h_1 \\ h_3^* & -h_3^* & h_4 & -h_4 \\ h_4^* & -h_4^* & -h_3 & h_3 \end{bmatrix} \text{ and } \begin{bmatrix} h_1^* & h_2 & 0 & 0 \\ -h_2^* & h_1 & 0 & 0 \\ 0 & 0 & h_3^* & h_4 \\ 0 & 0 & -h_4^* & h_3 \end{bmatrix},$$

where $h_1$, $h_2$, $h_3$, and $h_4$ are the complex channel characteristics of the channels between a $1^{st}$, $2^{nd}$, $3^{rd}$, and $4^{th}$ channel encoder, respectively, and the receive antenna.

3. The receiver of claim 2, wherein the channels are flat-faded channels.

4. The receiver of claim 1, further comprising:
   two pairs of correlators, each pair of correlators despreading two symbol sub-streams of two channels that terminate on the receive antenna and providing the despread symbol sub-streams to a selective conjugator.

5. The receiver of claim 1, further comprising:
   a selective conjugator for receiving two pairs of despread symbol substreams from two pairs of correlators.

6. The receiver of claim 1, further comprising:
   a demultiplexer for dividing a received baseband signal into four received symbol sub-streams having symbols received in one of four consecutive symbol periods allocated to a different one of the four received symbol sub-streams.

7. The receiver of claim 6, wherein the four received symbol sub-streams correspond to four series of transmit-sequence chains space-time coded for transmission from a transmitter having at least four transmit antennas, wherein the four transmit-sequence chains comprise two pairs of transmit-sequence chains, the space-time coding being such that each of the formed pairs of the transmit-sequence chains is a function of symbols of a pair of symbol sub-streams and not a function of the symbols of another pair of symbol sub-streams, wherein each transmit sequence of a particular transmit-sequence chain is a function of 1) a symbol of one of the symbol sub-streams of the respective symbol sub-stream pair and 2) a complex conjugate of a symbol of the other symbol sub-stream of the respective symbol sub-stream pair.

8. The receiver of claim 7, wherein each transmit sequence has a duration of four symbol periods, and portions of the at least four transmit-sequence chains are representable by a matrix where each row of the matrix represents one transmit sequence of a respective different one of the transmit-sequence chains and each column of the matrix represents one symbol period.

9. The receiver of claim 7, wherein portions of the at least four transmit-sequence chains are representable by a matrix where:
each row of the matrix represents one transmit sequence of a respective different one of the transmit-sequence chains;
each column of the matrix represents one symbol period; and
the matrix is one of $$\begin{bmatrix} b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3^* & -b_3^* \end{bmatrix} \text{ and } \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix},$$

where:
$b_1$ and $b_2$ are symbols of first and second symbol sub-streams, respectively, of one of the symbol-sub-stream pairs,
$b_3$ and $b_4$ are symbols of first and second symbol sub-streams, respectively, of another of the symbol-sub-stream pairs, and
$b_1^*$, $b_2^*$, $b_3^*$, and $b_4^*$ are complex conjugates of $b_1$, $b_2$, $b_3$, and $b_4$, respectively.

10. A method, comprising:
multiplying a matrix with received symbol sub-streams of a received signal, the matrix having at least two pairs of consecutive rows, each such pair being a function of channel characteristics of at least two channels that terminate on a receive antenna but not of channel characteristics of other channels that terminate on the receive antenna, and the matrix being orthogonal;
wherein the sequence of received symbols of a particular channel is a function of 1) a symbol of one of the symbol sub-streams associated with one of the channels of the respective channel pair and 2) a complex conjugate of a symbol of the other symbol sub-stream associated with the other channel of the respective channel pair.

11. The method of claim 10, wherein the matrix is $H^\dagger$, which comprises one of:

$$\begin{bmatrix} h_1^* & h_1^* & h_2 & h_2 \\ h_2^* & h_2^* & -h_1 & -h_1 \\ h_3^* & -h_3^* & h_4 & -h_4 \\ h_4^* & -h_4^* & -h_3 & h_3 \end{bmatrix} \text{ and } \begin{bmatrix} h_1^* & h_2 & 0 & 0 \\ -h_2^* & h_1 & 0 & 0 \\ 0 & 0 & h_3^* & h_4 \\ 0 & 0 & -h_4^* & h_3 \end{bmatrix},$$

where $h_1$, $h_2$, $h_3$, and $h_4$ are the complex channel characteristics of the channels between a $1^{st}$, $2^{nd}$, $3^{rd}$, and $4^{th}$ channel encoder, respectively and the receive antenna.

12. The method of claim 11, wherein the channels are flat-faded channels.

13. The method of claim 10, further comprising:
receiving a baseband signal; and
demultiplexing the received baseband signal into four received symbol sub-streams.

14. The method of claim 13, further comprising:
despreading four received symbol sub-streams; and
determining a complex conjugate of any of the symbols of any of the four despread symbol sub-streams.

15. The method of claim 13, wherein the four received symbol sub-streams correspond to four series of transmit-sequence chains space-time coded for transmission from a transmitter having at least four transmit antennas, wherein the four transmit-sequence chains comprise two pairs of transmit-sequence chains, the space-time coding being such that each of the formed pairs of the transmit-sequence chains is a function of symbols of a pair of symbol sub-streams and not a function of the symbols of another pair of symbol sub-streams, wherein each transmit sequence of a particular transmit-sequence chain is a function of 1) a symbol of one of the symbol sub-streams of the respective symbol sub-stream pair and 2) a complex conjugate of a symbol of the other symbol sub-stream of the respective symbol sub-stream pair.

16. The method of claim 15, wherein each transmit sequence has a duration of four symbol periods, and portions of the at least four transmit-sequence chains are representable by a matrix where each row of the matrix represents one transmit sequence of a respective different one of the transmit-sequence chains and each column of the matrix represents one symbol period.

17. The method of claim 15, wherein portions of the at least four transmit-sequence chains are representable by a matrix where:
each row of the matrix represents one transmit sequence of a respective different one of the transmit-sequence chains;
each column of the matrix represents one symbol period; and
the matrix is one of $$\begin{bmatrix} b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3^* & -b_3^* \end{bmatrix} \text{ and } \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix},$$

where:
$b_1$ and $b_2$ are symbols of first and second symbol sub-streams, respectively, of one of the symbol-sub-stream pairs,
$b_3$ and $b_4$ are symbols of first and second symbol sub-streams, respectively, of another of the symbol-sub-stream pairs, and
$b_1^*$, $b_2^*$, $b_3^*$, and $b_4^*$ are complex conjugates of $b_1$, $b_2$, $b_3$, and $b_4$, respectively.

18. A method, comprising:
receiving two pairs of transmit-sequence chains, the pairs of transmit-sequence chains being formed by space-time coding respective pairs of symbol sub-streams, the space-time coding being such that each pair of the transmit-sequence chains is a function of symbols of the respective pair of symbol sub-streams and not a function of the symbols of the other pair of symbol sub-streams; and
multiplying a matrix with received symbol sub-streams of a received signal, the matrix having two pairs of consecutive rows, each such pair being a function of channel characteristics of two channels that terminate on a receive antenna but not of channel characteristics of two other channels that terminate on the receive antenna;
wherein the sequence of received symbols of a particular channel is a function of 1) a symbol of one of the symbol sub-streams associated with one of the channels of the respective channel pair and 2) a complex conjugate of a symbol of the other symbol sub-stream associated with the other channel of the respective channel pair.

19. The method of claim 18, wherein portions of the four transmit-sequence chains are representable by a matrix where:

each row of the matrix represents one transmit sequence of a respective different one of the transmit-sequence chains;
each column of the matrix represents one symbol period; and
the matrix is one of $$\begin{bmatrix} b_1 & b_1 & -b_2^* & -b_2^* \\ b_2 & b_2 & b_1^* & b_1^* \\ b_3 & -b_3 & -b_4^* & b_4^* \\ b_4 & -b_4 & b_3^* & -b_3^* \end{bmatrix} \text{ and } \begin{bmatrix} b_1 & -b_2^* & 0 & 0 \\ b_2 & b_1^* & 0 & 0 \\ 0 & 0 & b_3 & -b_4^* \\ 0 & 0 & b_4 & b_3^* \end{bmatrix},$$

where:
$b_1$ and $b_2$ are symbols of first and second symbol sub-streams, respectively, of one of the symbol-sub-stream pairs,
$b_3$ and $b_4$ are symbols of first and second symbol sub-streams, respectively, of another of the symbol-sub-stream pairs, and
$b_1^*, b_2^*, b_3^*,$ and $b_4^*$ are complex conjugates of $b_1, b_2, b_3,$ and $b_4$, respectively.

* * * * *